United States Patent Office 3,453,582
Patented July 1, 1969

3,453,582
FORCE-MEASURING DEVICE
Gottfried Birkholtz, Weiterstadt, Germany, assignor to Carl Schenck Maschinenfabrik G.m.b.H., Darmstadt, Germany, a corporation of Germany
Filed Dec. 15, 1966, Ser. No. 601,962
Claims priority, application Germany, Dec. 18, 1965.
Sch 38,205
Int. Cl. G01l 1/22
U.S. Cl. 338—5                    10 Claims

ABSTRACT OF THE DISCLOSURE

A deformation member is constructed in the form of an annular ring having a first and a second surface line coaxial with the center axis of the ring, the force to be measured being introduced at the first surface line and a reactive force at the second surface line which is spaced from the first surface line. A transducer element is carried by the annular ring on a surface thereof located between both surface lines.

---

My invention relates to force-measuring device with a deformation member subjected to torsional stress by the force to be measured, and mechanical-electrical transducer elements for transforming the changes produced by the force in the shape or stresses of the material of the deformation member into proportional measurement signals.

In known devices of this type, the end of a rod-shaped deformation member is twisted by an applied force with respect to the other end of the member at which a reactive force acts. The change in the shape of the deformation member or the change in the stresses in the deformation member produced thereby is then taken up by a mechanical-electrical transducer element mounted on the deformation member, such as, for example, electrical resistance expansion measuring strips or tapes, measuring wire windings, electrical semiconductor expansion measuring strips, or the like, and is transformed into proportional electrical measuring signals. As a rule, such devices are suitable solely for measuring a force produced by a turning movement. For ascertaining the value of linearly directed forces, considerable expense is necessary for transforming such a force into a turning force. Although it is possible to follow such a procedure, it is nevertheless impractical because of the relatively small measuring efficiency thereof when compared to the known devices having other modes of operation and which directly determine the value of linearly directed forces.

A device is furthermore known in which the bending of a flat circular plate-shaped deformation body produces a reduction or increase in the periphery of circular expansion margins thereon which extend perpendicular to the plane of the plate, and the compression or expansion of the material thereby effected therein is transformed through mechanical-electrical transducer elements into proportional measuring signals. This device, which transforms the bending of one member into a deformation of a second member, considering the required expense, is uneconomical and requires relatively large installation space. The multiple transformation required by this principle is accompanied furthermore by a series of sources of measuring defects which prevent attainment of a good measuring efficiency and a high measuring accuracy.

It is accordingly an object of my invention to provide force-measuring device which avoids the foregoing disadvantages of the heretofore known devices of this type and which moreover affords improved measuring efficiency and accuracy over the heretofore known devices.

More specific objects of my invention are to provide a device meeting the high requirements of accuracy, reproducibility and linearity of the measurement in spite of slight influences due to hysteresis, creep, and transverse forces, and which provides furthermore advantageous mechanical-electrical transducers, for use in measuring technology with high-ohmic measurement bridges mounted at localities of maximum deformation and uniform temperature influence.

With the foregoing and other objects in view, I provide, in accordance with my invention, a deformation member constructed in the form of an annular ring having a first and a second surface line coaxial with the center axis of the ring, the force to be measured being introduced at the first surface line, and a reactive force being applied at the second surface line which is spaced from the first surface line, and a transducer element carried by the annular ring on a surface thereof located between both of the surface lines.

Other features which are considered as characteristic for the invention are set forth in the appended claims.

Although the invention is illustrated and described herein as embodied in force-measuring device, it is nevertheless not intended to be limited to the details shown, since various modifications and structural changes may be made therein without departing from the spirit of the invention and within the scope and range of equivalents of the coaims.

The construction and method of operation of the invention, however, together with the additional objects and advantages thereof will be best understood from the following description of specific embodiments when read in connection with the accompanying drawings in which.

Figure 1:
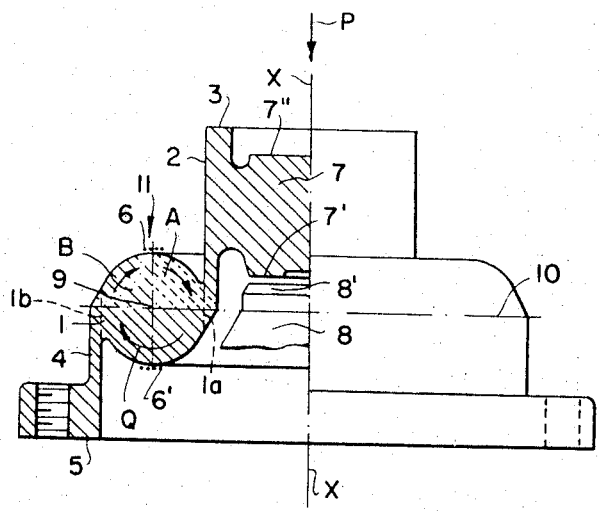
FIG. 1 is a side view partly in section of a device constructed in accordance with my invention, which has a deformation member circular in cross section.

Referring now to the drawings, and first particularly to FIG. 1 thereof, there is shown an embodiment of my invention having an annular deformation member 1 of circular cross section. A tubular extension 2 located concentric to the central axis x—x of the device is in engagement with an inner surface line 1b thereof, i.e. at that borderline having the smallest radial spacing from the central axis x—x of the device, as shown in FIG. 1. An additional tubular extension located concentric to the central axis x—x is in engagement with an outer surface line 1b of the deformation member, i.e. at the borderline having the largest radial spacing from the central axis x—x. The tubular extension 4 is provided with a support surface 5 on the end thereof most distant from the deformation member 1. Substantially in the center between the surface lines 1a and 1b at which the tubular extensions 2 and 4, respectively, engage the annular deformation member 1, electric resistance wires in the form of windings 6 and 6' lying concentric to the axis x—x are disposed on the surface of the deformation member 1 and are firmly bonded to the deformation member 1, for example by means of a suitable adhesive. The tubular extension 2 is rigidly connected to a central portion 7. The lower portion 7' of the central portion 7 is made level or horizontal. The horizontal surface 8' of a stop member 8 and the surface 7' of the central portion are located opposite one another at a preselected, preferably adjustable spacing therebetween. The force to be measured acts in the direction of the arrow P, for example through a pressure punch or pin (not shown) on the upper surface 7" of the central portion 7. In the embodiment of FIG. 1, the central portion 7 and the tube extension 2 are made of one piece.

The device is stationarily supported on the surface 5 by suitable bolts or screws passing through the illustrated bores in the lower extension 4. The force to be measured is introduced through the tubular extension 2 in the direction of the arrow P, that is, parallel to the axis x—x, at the inner surface line, and the reactive force produced by the support at the surface 5 is introduced opposite to the direction of the arrow P and parallel to the axis x—x through the tubular extension 4 at the outer surface line respectively in a direction tangential to the peripheral surface of the member 1. The material of the deformation member 1 experiences an inverting movement in the direction of the arrow Q. This movement takes place about a line concentric to the axis x—x in the form of a circular arc at which the least stressing of the material in the interior of the member occurs. This circular arc nearly coincides with the circular geometric center line 9 of the member 1 which is concentric to the axis x—x; however, due to the resulting oppositely directed stressing or loading applied above and below the middle surface 10, as a rule, the circular arc does not entirely coincide with the arcuate geometrical center line 9 of the member 1 which is concentric to the axis x—x.

Due to the all-around rotation of the member 1 toward the interior, i.e. clockwise, resulting from the action of the force to be measured, the surface of that portion of the member 1 located above the middle surface 10 is rotated on all sides into the vicinity of the smaller diameter of the member 1, i.e. the diameter of the tube extension 2. The material of the deformation member 1 is thereby compressed. This compression is at its greatest at the locality 11 of the surface which is spaced farthest from the middle surface 10. Influences are superimposed on this compression, caused by the introduction of the applied force and the reactive force. As a result of the introduction of the force to the tubular extension 2, an expansion additionally occurs in the deformation member 1 in the region A and, due to the introduction of the reactive force to the tubular extension 4, a compression occurs additionally in the region B. These additional phenomena araise at the transition localities of both regions. By mounting the winding 6 at the locality 11, a maximum measuring efficiency is therefore achieved with minimum disturbing influences. The same relationships or conditions apply for the portion of the member 1 lying beneath the middle surface 10 as viewed in FIG. 1, but with opposite signs however. Due to the reactive stress, when the torsion member 1 is subjected to a load above and below the surface 10, the circular arcuate line about which the inverting movement takes place in the direction of the arrow Q, travels upwardly in the direction of the compressed portion, that is, for a loading applied in the direction of the arrow P, due to the increase in the cross section of the compressed portion and decrease in the cross section of the expanded portion. This load-dependent travel of the circular arcuate line, together with the load-dependent movement of the surface lines at which the forces are introduced, produces a linear spring characteristic at the locations at which the windings 6, 6' are mounted. To prevent reactions to the deformation of the member 1 at the support surfaces 5 and 7" from causing friction or clamping which can produce falsification of the measurement, the tubular extensions 2 and 4 are suitably dimensioned in axial length so that deformations of the tubular extensions occurring due to such reactions do not extend all the way to the supporting surfaces 5 and 7".

The portions 7 and 8 act as overload safety devices. so adjusted that when a maximum allowable travel or rise is exceeded, such as for an overload of the device, the surface 7' and the surface 8' engage one another and a direct removal of the overload consequently occurs. My invention is not limited, however, to the embodiment specifically shown in FIG. 1 wherein the deforming member has a circular cross section. Analogous relationships exist, for example, when the member 1 is not solid but is rather formed as an annular bent tube.

Figure 2:
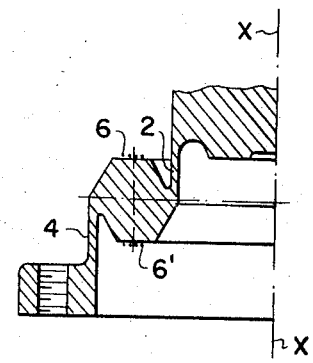
FIG. 2 is a view of the left-hand side of the embodiment of FIG. 1 modified with an annular deformation member having a hexagonal cross section.
Figure 3:
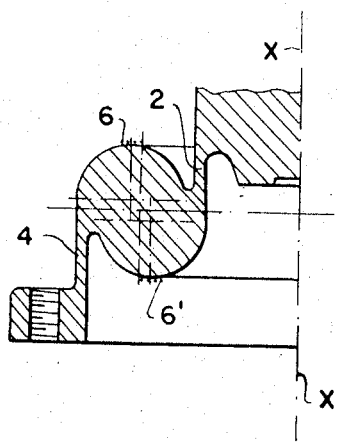
FIG. 3 is a similar view as that of FIG. 2, further modified with an annular deformation member having an elliptical cross section.
Figure 4:
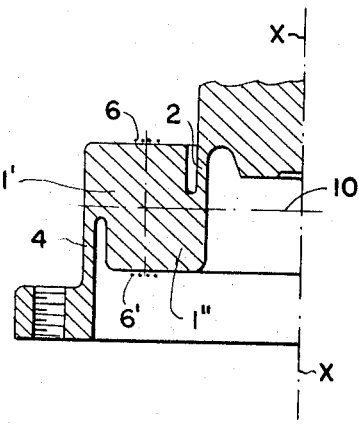
FIG. 4 is still another view similar to that of FIGS. 2 and 3 further modified with an annular deformation member having a rectangular cross section and two halves laterally displaced relative to one another.

As further modifications of the cross-sectional form of suitable annular deformation members coming within the scope of my invention, FIG. 2 shows a member with a regular polygonal i.e. a hexagonal cross section, FIG. 3 shows a member with an elliptical cross section, and FIG. 4 shows a member with rectangular cross section. In principle, circular rings of virtually any desired cross section are usable in accordance with my invention as long as care is taken only that the transducer elements are located in the force field between the force introduction elements. Instead of the aforedescribed wire windings 6, 6', electrical resistance expansion measuring strips, semiconductor layer expansion measuring strips and the like can be used for the transducer elements. Though in fact the measuring efficiency is optimum when the transducer elements are located at the surface of the deformation member, nevertheless they can also be located in the interior of the deformation member in a suitable manner.

Instead of the tubular force introduction members 2 and 4, other introduction members engaging along respective generatrix lines can also be provided, for example individual steps distributed along the respective generatrix lines.

As is shown in the modification of FIG. 4, the annular deformation member can also be formed of two rectangular halves 1' and 1" offset from one another along the middle surface 10 extending perpendicular to the center axis x—x. In this way, in the same manner as for the cross-sectional shapes shown in FIGS. 2 and 3, the force introduction into deformation member can have an especially effective and efficient form.

I claim:

1. Force-measuring device comprising a deformation member in the shape of a ring having a center axis, means for transmitting an applied force to be measured to a first surface line on said ring coaxial with said center axis, means for transmitting a reactive force to a second surface line on said annular ring coaxial to and spaced from said first surface line whereby a surface portion of said annular ring is located between said surface lines, said annular ring having a cross section twistable about a center lying within it in response to said transmitted applied and reactive forces, and mechanical-to-electrical transducer means carried on said surface portion for transforming a resulting change into electric measuring signals.

2. Force-measuring device according to claim 1 wherein said transducer element is formed of resistance wire windings secured on said surface portion of said ring and disposed coaxial with the said center axis.

3. Force-measuring device according to claim 1 wherein said deformation member has a circular cross section.

4. Force-measuring device according to claim 1 wherein said deformation member has a rectangular cross section.

5. Force-measuring device according to claim 1 wherein said deformation member has a rhombic cross section.

6. Force-measuring device according to claim 1 wherein the cross section of said deformation member is in the form of a regular polygon.

7. Force-measuring device according to claim 1 wherein said deformation member in cross section consists of two halves offset from one another along a middle surface of the device extending substantially perpendicularly to said center axis.

8. Force-measuring device according to claim 1, wherein said surface lines respectively are defined by the shortest and longest diameters of said ring, said applied force means comprising respective members in engagement with said ring at said surface lines for transmitting to said ring said applied force and said reactive force in directions substantially tangential and parallel to the center axis of said ring.

9. Force-measuring device according to claim 8 wherein said force transmitting members are in the form of tubular extensions coaxial to said center axis.

10. Force-measuring device according to claim 8 wherein said force transmitting members have a predetermined length extending in a direction parallel to said center axis for preventing deformation, occurring in said force introducing members when said deformation member is twisted, from being transferred to the ends of said force transmitting members located most distant from said deformation member.

References Cited

UNITED STATES PATENTS

| | | |
|---|---|---|
| 2,848,892 | 8/1958 | Hoffman. |
| 3,124,770 | 3/1964 | Ciavatta _____ 338—5 |
| 3,216,245 | 11/1965 | Seed _____ 338—5 |
| 3,365,689 | 1/1968 | Kutsay _____ 338—5 |

FOREIGN PATENTS 922,982   4/1963   Great Britain.

REUBEN EPSTEIN, *Primary Examiner.*